(12) United States Patent
Warmbold et al.

(10) Patent No.: US 11,499,274 B2
(45) Date of Patent: Nov. 15, 2022

(54) BLACK LOCUST SOLAR PERMEABLE PAVERS WITH SAFETY EDGE PROTECTION

(71) Applicant: Dragon Group KFT, Nyirbator (HU)

(72) Inventors: Maria E. Warmbold, Hickory, NC (US); Donald J. Warmbold, Hickory, NC (US)

(73) Assignee: DRAGON GROUP KFT, Nyirbator (HU)

( * ) Notice: Subject to any disclaimer, the term of this patent is extended or adjusted under 35 U.S.C. 154(b) by 78 days.

(21) Appl. No.: 17/061,329

(22) Filed: Oct. 1, 2020

(65) Prior Publication Data

US 2021/0095430 A1    Apr. 1, 2021

Related U.S. Application Data

(60) Provisional application No. 62/909,592, filed on Oct. 2, 2019, provisional application No. 62/909,065, filed on Oct. 1, 2019.

(51) Int. Cl.
| | | |
|---|---|---|
| *E01C 11/22* | (2006.01) | |
| *E01C 5/14* | (2006.01) | |
| *E01C 7/04* | (2006.01) | |

(52) U.S. Cl.
CPC .............. *E01C 11/225* (2013.01); *E01C 5/14* (2013.01); *E01C 7/04* (2013.01); *E01C 2201/04* (2013.01); *E01C 2201/167* (2013.01)

(58) Field of Classification Search
CPC . E01C 11/225; E01C 5/14; E01C 7/04; E01C 2201/04; E01C 2201/167
See application file for complete search history.

(56) References Cited

U.S. PATENT DOCUMENTS

| | | | | |
|---|---|---|---|---|
| 130,027 | A * | 7/1872 | Dyer | |
| 595,616 | A * | 12/1897 | Freese | |
| 3,296,469 | A * | 1/1967 | Hall ...................... | H02K 99/20 318/400.29 |
| 3,419,434 | A * | 12/1968 | Colehower ......... | H01L 31/0547 136/246 |
| 3,795,180 | A * | 3/1974 | Larsen ................... | E01C 13/02 405/36 |
| 3,841,302 | A * | 10/1974 | Falbel .................. | F24F 5/0046 126/609 |
| 4,235,643 | A * | 11/1980 | Amick .................. | H01L 31/048 136/246 |
| 5,701,067 | A * | 12/1997 | Kaji ........................ | H02S 40/38 320/101 |
| 8,297,874 | B2 * | 10/2012 | Krzyzak ............... | E01C 11/224 404/31 |

(Continued)

*Primary Examiner* — Abigail A Risic
(74) *Attorney, Agent, or Firm* — NK Patent Law

(57) ABSTRACT

The subject matter described herein includes a paving system having a backing matrix, a plurality of untreated black locust wood pavers arranged in a defined pattern relative to one another on the backing matrix, the defined pattern creating regular void spaces therebetween, a permeable medium disposed between the wood pavers and filling the void spaces, at least one solar cell embedded within at least one wood paver, one or more layers of underlayment beneath the matrix, the one or more layers of underlayment having graduated sizes or porosities, and a flexible coating displaced around the perimeter of the backing matrix.

10 Claims, 19 Drawing Sheets

(56) References Cited

U.S. PATENT DOCUMENTS

| | | | | |
|---|---|---|---|---|
| 9,617,698 | B1* | 4/2017 | Stiles | F21S 2/00 |
| 10,626,561 | B2* | 4/2020 | Riccobene, Jr. | E01C 11/225 |
| 2010/0154943 | A1* | 6/2010 | Langer | E04G 21/30 |
| | | | | 150/154 |
| 2016/0301355 | A1* | 10/2016 | Small | E01C 17/00 |
| 2016/0320048 | A1* | 11/2016 | Daniels | F21S 2/00 |
| 2017/0051459 | A1* | 2/2017 | Warmbold | E01C 5/14 |
| 2017/0252256 | A1* | 9/2017 | Henshue | H02G 9/10 |
| 2017/0292227 | A1* | 10/2017 | Kim | E01C 5/22 |
| 2018/0159461 | A1* | 6/2018 | Lavi | H01L 31/048 |
| 2020/0262716 | A1* | 8/2020 | Buch | C02F 1/004 |

* cited by examiner

BLACK LOCUST SOLAR PERMEABLE PAVERS WITH SAFETY EDGE PROTECTION

TECHNICAL FIELD

The presently disclosed subject matter is directed towards wooden pavers and tiles. Specifically the presently disclosed subject matter is directed towards wooden pavers and tiles with safety edge protection adapted to complete the construction, decoration and landscaping of outdoor areas.

BACKGROUND

Concrete and asphalt are ubiquitous in urban environments, yet these paving methods, while durable and easy to create, are impermeable and prevent water from reaching underground aquifers. Precipitation that lands on an impermeable surface will either become standing water and evaporate, or will run down slope, potentially coming into contact with any number of contaminants until it reaches an area where groundwater can permeate the surface. In regions with high levels of precipitation, impermeable surfaces greatly contribute to flooding, which often results in costly infrastructural damage. By contrast, in regions with little precipitation, preventing water from infiltrating into the substrate, and in certain cases, underground aquifers, can have numerous negative structural and environmental impacts.

Another unfortunate side effect of impermeable paving methods, such as concrete and asphalt, is that they absorb heat as short-wave radiation during the day and release that stored thermal energy as long-wave radiation at night, contributing to what is known as an "urban heat-island" effect. The "urban heat-island" effect refers to the significant heating of an urban area due to human activities, largely as a result of reduced vegetation and the widespread use of impermeable paving methods. To compensate for the heat, people use more energy to run fans and air conditioners, creating a vicious cycle of more pollution, more greenhouse gas effect, and even higher temperatures. Apart from these environmental consequences, asphalt and concrete are not aesthetically unique or visually pleasing.

Wood is an age-old material, and has been used for paving. Although wood tends not to contribute to the urban heat island effect and has more aesthetically pleasing characteristics, wood blocks and tiles are not very durable or rot resistant and will tend to disintegrate when left in contact with the ground for long periods of time. For that reason, wood is traditionally treated with creosote, tar, or other chemicals, as shown by Ruff, U.S. Pat. No. 853,034, a 1907 patent. While wood treatments have advanced over the last century, treating wood blocks to improve their durability and environmental resistance is complex and involves environmental risks as well as safety risks to the installer.

The presently disclosed subject matter provides improved systems and methods for wooden paving tiles that overcome the disadvantages of existing systems and methods.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is a paver. The paver is made entirely of natural wood, such as Black Locust wood, and may be in the form of a block or tile. A plurality of wooden pavers set in the earth with a regular defined distance between each creates a paved area, such as a patio, while allowing water to permeate the surface and potentially reducing unwanted solar heating. A wire mesh, or another form of backing matrix, may be used in some embodiments in order to maintain the correct spacing during installation.

According to one or more embodiments, each paver may have the general shape of a cube. In other words, each paver may have four sidewalls connected at the corners by one superior and one inferior face of identical dimension. Depending on the installation, aesthetics, and other factors, the grain of each paver may be oriented vertically. Alternatively, some pavers may have their grain oriented in other directions.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a paving system, including a plurality of untreated black locust wood pavers arranged in a defined pattern relative to one another, the defined pattern creating regular void spaces therebetween. The paving system also includes where the void spaces and the paving system as a whole are water permeable in a finished installation. Other embodiments of this aspect include corresponding computer systems, apparatus, and computer programs recorded on one or more computer storage devices, each configured to perform the actions of the methods.

Implementations may include one or more of the following features. The paving system may further include a backing matrix that maintains the defined pattern and the void spaces. The paving system may be designed such that the backing matrix includes a wire mesh. The paving system may be designed such that the wood pavers are disposed in or on the wire mesh. The paving system may be designed such that the wood pavers are attached to the wire mesh. The paving system may be designed such that the wood pavers are arranged with their grain oriented vertically. The paving system may be designed such that the wood pavers are cubic. The paving system may further include a backing matrix, where the plurality of pavers are arranged in a rectangular array on or in the backing matrix. Implementations of the described techniques may include hardware, a method or process, or computer software on a computer-accessible medium.

One general aspect includes a paving system, including a plurality of untreated black locust wood pavers arranged in a defined pattern relative to one another on a backing matrix, the defined pattern creating regular void spaces therebetween, the void spaces being maintained with a permeable medium, such that the paving system as a whole is water permeable. Other embodiments of this aspect include corresponding computer systems, apparatus, and computer programs recorded on one or more computer storage devices, each configured to perform the actions of the methods.

Implementations may include one or more of the following features. The paving system may have gravel as the permeable medium. The paving system may have a plurality of layers of gravel as the permeable medium. The gravel may be of different sizes, arranged in graduated sizes of gravel, with small gravel maintaining the void spaces and larger layers of gravel underneath. The paving system may have the plurality of layers of gravel or rock beneath the wood pavers, the plurality of layers of gravel or rock being progressively coarser than the gravel of the permeable medium. The paving system may be designed such that the backing matrix includes a wire mesh. Implementations of the described techniques may include hardware, a method or process, or computer software on a computer-accessible medium.

One general aspect includes a paving system, including a backing matrix. The paving system also includes a plurality of untreated black locust wood pavers arranged in a defined pattern relative to one another on the backing matrix, the defined pattern creating regular void spaces therebetween. The paving system also includes a permeable medium disposed between the wood pavers and filling the void spaces. The paving system also includes one or more layers of underlayment beneath the backing matrix, the one or more layers of underlayment having graduated sizes or porosities. Other embodiments of this aspect include corresponding computer systems, apparatus, and computer programs recorded on one or more computer storage devices, each configured to perform the actions of the methods.

Implementations may include one or more of the following features. The paving system may be designed so that the backing matrix is a wire mesh with crisscrossing parallel wires. In one or more embodiments, the wood pavers are fastened to the backing matrix. In one or more embodiments, the wood pavers are substantially cubic tiles. The paving system may include a permeable medium such as gravel. The paving system may include one or more layers of underlayment such as gravel or crushed rock. Implementations of the described techniques may include hardware, a method or process, or computer software on a computer-accessible medium.

One or more embodiments of a paving system, includes a backing matrix. The paving system also includes a plurality of untreated black locust wood pavers in a spaced apart arrangement, fixedly attached to the backing matrix. The paving system also includes a permeable medium disposed between the wood pavers. The paving system also includes one or more layers of underlayment beneath the backing matrix, the one or more layers of underlayment having graduated sizes or porosities. The paving system also includes at least one wireless sensor embedded between the wood pavers, where the sensor receives temperature and humidity data. The sensor may be positioned in a more optimal location such as in the root structure of embedded plants. The sensor may also be configured to receive moisture and irrigation data. The sensor may also be configured for recording foot and vehicle traffic as well to provide useful upkeep information for pathways. Different sensors may be used for each function, or a single sensor may perform all of these functions. Other embodiments of this aspect include corresponding computer systems, apparatus, and computer programs recorded on one or more computer storage devices, each configured to perform the actions of the methods.

According to one or more embodiments temperature and humidity data is transmitted to a cloud. In one embodiment, any or all data collected by the one or more sensors may be transmitted to a cloud for evaluation. The paving system may be configured where the at least one wireless sensor detects surface activities, conditions, and structural damage. The at least one wireless sensor may provide data for circulation statistics. In one embodiment, irrigation and water-saving can be controlled by embedded wireless sensors. Implementations of the described techniques may include hardware, a method or process, or computer software on a computer-accessible medium.

According to one or more embodiments the paving system, includes a backing matrix. The paving system also includes a plurality of untreated black locust wood pavers arranged in a defined pattern relative to one another on the backing matrix, the defined pattern creating regular void spaces therebetween. In one embodiment the defined pattern is a perpendicular pattern. The pavers may be positioned on the backing matrix in a spaced apart relationship where the spacing is determined by the size of the pavers. The paving system also includes a permeable medium disposed between the wood pavers and filling the void spaces. The paving system also includes one or more layers of underlayment beneath the backing matrix, the one or more layers of underlayment having graduated sizes or porosities. The paving system also includes a flexible coating displaced around the perimeter of the backing matrix. The flexible coating is added to protect the edges of the backing matrix from injuring the hands of persons installing the pavers.

According to one or more embodiments, the backing matrix is a metal wire mesh. According to one or more embodiments, the flexible coating is beeswax. The flexible coating may also be soy wax, rubber, or any combination thereof.

According to one or more embodiments, the wood paver comprises wedges configured for positioning the solar cell at a fixed angle.

According to one or more embodiments, the wood paver comprises a reflective surface configured for maximizing efficacy of the solar cell.

These and other aspects, features, and advantages of the presently disclosed subject matter will be set forth in the description that follows.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1:
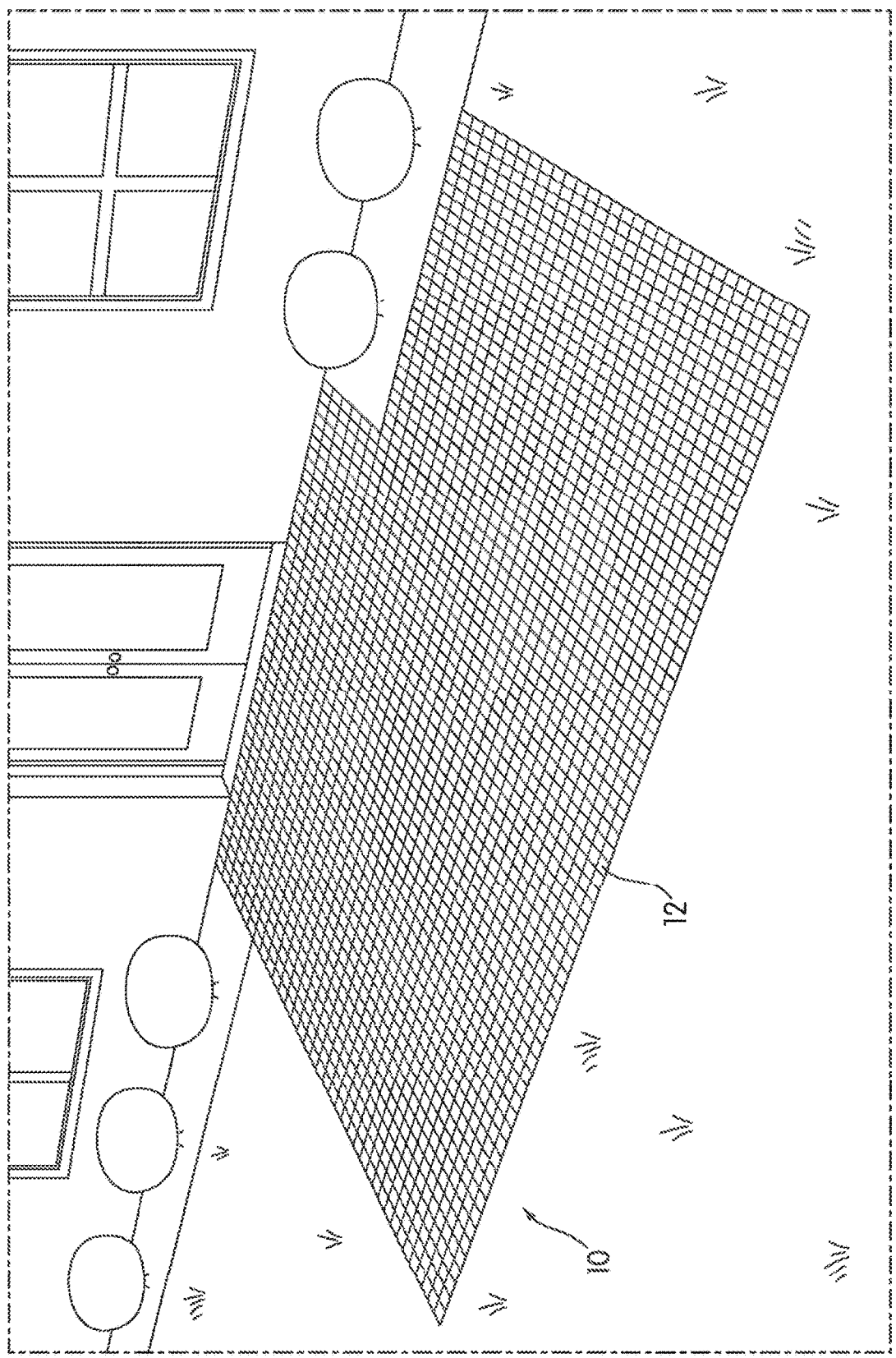
FIG. 1 is a perspective view of a plurality of wooden paving tiles installed to form a patio according to one embodiment of the invention.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the presently disclosed subject matter.

FIG. 1 is a perspective view of a patio, generally indicated at 10, according to one embodiment of the invention. The patio 10 is comprised of a plurality of wooden pavers 12 constructed entirely of untreated natural wood. In the illustrated embodiment, the pavers 12 have the form of tiles.

As was described above, soft woods are not typically suitable for paving without first undergoing some form of chemical treatment. The same is true of many common hardwoods. There are a number of exotic hardwoods that may be durable enough to be suitable for paving tiles 12, but many of those woods have a high oil content, and thus tend to be slippery when wet. High oil content can also prevent tropical hardwoods from accepting decorative colorants, such as stain. Additionally, non-sustainable harvesting methods and international trade restrictions make exotic hardwoods expensive and difficult to acquire.

In the illustrated embodiment of the patio 10, the wooden tiles 12 are made of untreated Black Locust wood (*Robinia pseudoacacia*). Black Locust wood is a domestically grown and sustainably harvested lumber well suited for the embodiments of the invention. Among the favorable properties of Black Locust wood are a Janka Hardness rating of 1,700 lbf, durability, and organic rot resistance. While the present inventor does not wish to be bound by any particular theory, the pores of Black Locust wood are typically filled with minerals instead of oil, which allows the wood to be especially durable and resistant to slip hazards while retaining some capacity to accept decorative stain. Given the favorable properties of Black Locust wood, it is believed that without any chemical treatment, the plurality of paving tiles 12 may last up to sixty years. Moreover, at the end of their useful life, the paving tiles 12 can be incinerated without significantly polluting the environment. Although the present inventor has found Black Locust wood to be appropriate for embodiments of the invention, woods having other properties that compare favorably with those of Black Locust wood could be used.

Figure 2:
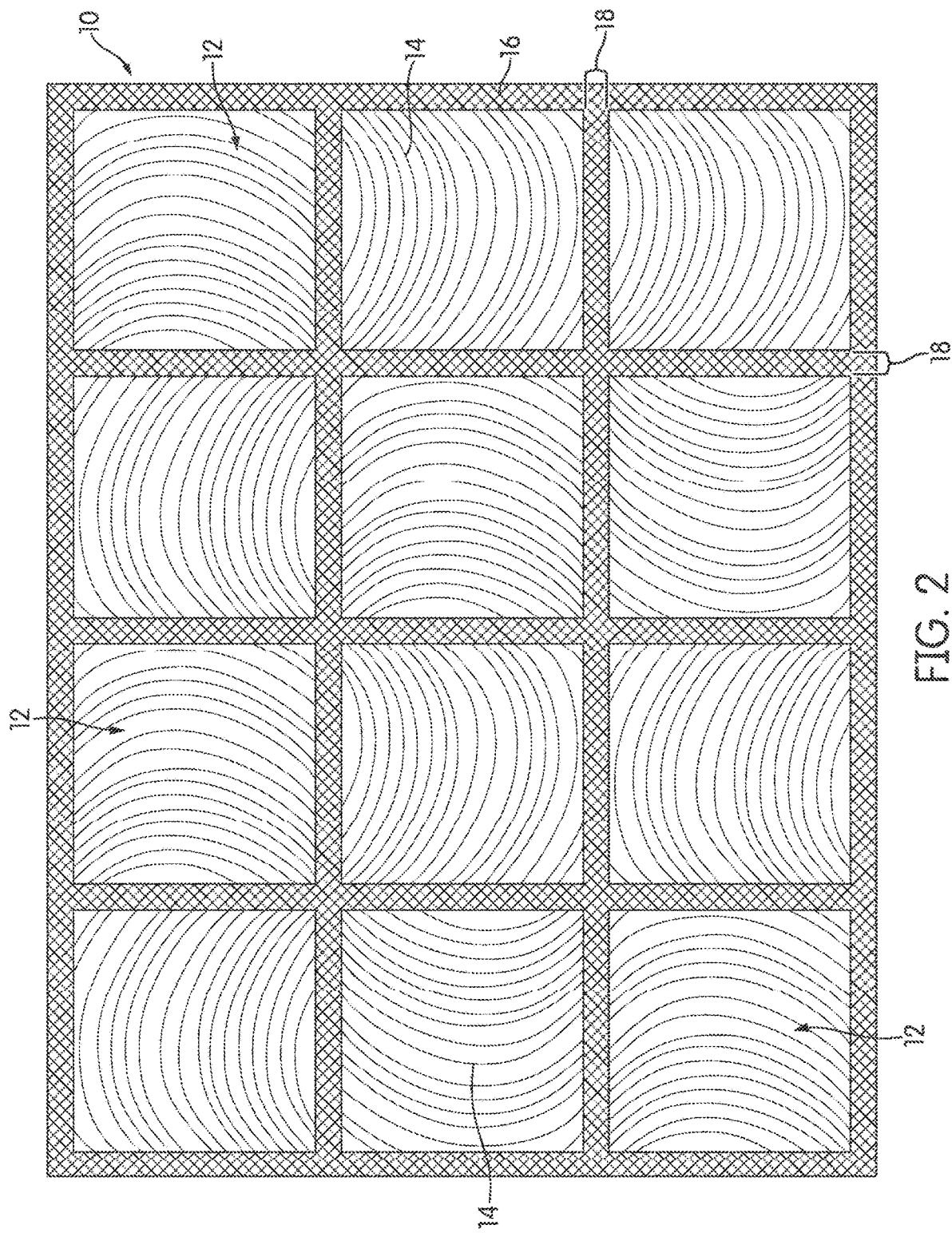
FIG. 2 is a top plan view of the wooden paving tiles of FIG. 1 before installation, showing a wire mesh upon which the wooden tiles are arranged.

FIG. 2 is a top plan view of the wooden tiles 12 before installation of the patio 10 of FIG. 1. In the illustration of FIG. 2, all of the wooden tiles 12 are shown as having their grain 14 oriented vertically. Wooden tiles arranged so that their grain is vertical, i.e., with the end grain 14 facing up, may exhibit greater strength and durability. This may be particularly helpful if the patio 10 or other paved area is likely to be subjected to large loads. However, the grain 14 need not always be oriented vertically.

The present inventor has found it advantageous to use a cube-shaped hard wood tile 12, as that allows the installer to choose the most aesthetically presentable face of the tile 12 and position it accordingly during installation without changing the way that the tiles 12 fit together. This means that the grain 14 of each tile 12 may be oriented differently; however, the visible surface of the patio 10 will be more aesthetically pleasing as a whole. Of course, depending on the application, the tiles 12 could be rectangular, cylindrical, or a variety of shapes. In some cases, the individual tiles 12 could be different shapes, for example, shapes that are intended to be complementary to one another.

In order to create the patio 10 of FIG. 1, The plurality of wooden tiles 12 could be placed directly in or on the ground; however, the present inventor has found that laying wooden tiles 12 on top of a backing matrix, such as a wire mesh 16, can be advantageous for keeping the tiles 12 appropriately placed during installation. After installation, the wire mesh 16 provides space to allow water to permeate the finished installation. In many cases, the paving tiles 12 need not be fastened to the wire mesh 16, although in some embodiments, wooden tiles 12 could be fastened to the mesh 16 with any type of fastener, such as a nail or staple. When a backing matrix, such as wire mesh 16, is used, the tiles 12 may be prepared and sold in 3×3, 3×4, 6×6, or 9×9 blocks of tiles 12, as shown in FIG. 2.

The wire mesh 16 could have a variety of mesh or hole sizes depending on the application. In a fastened embodiment of the invention, the wire mesh 16 could be constructed of a metal such as iron or mild steel, such that it oxidizes upon coming into contact with earth and water, and disintegrates over some period of time.

The permeability of the overall patio 10 or paved surface is derived from void spaces, generally indicated at 18, which allow groundwater to infiltrate beneath the ground surface. The void space 18 could be 3/8" in one embodiment of the invention, but the spacing is not critical so long as it allows water to permeate and is not so large that it creates an uneven surface. However, regulatory requirements in effect in particular locales may specify minimum or maximum spacings (e.g., 1/2 inch space) between pavers in order to maintain an even, easily navigable surface for wheelchair users. The void space could be filled with any number of materials to maintain the space 18.

Figure 3:
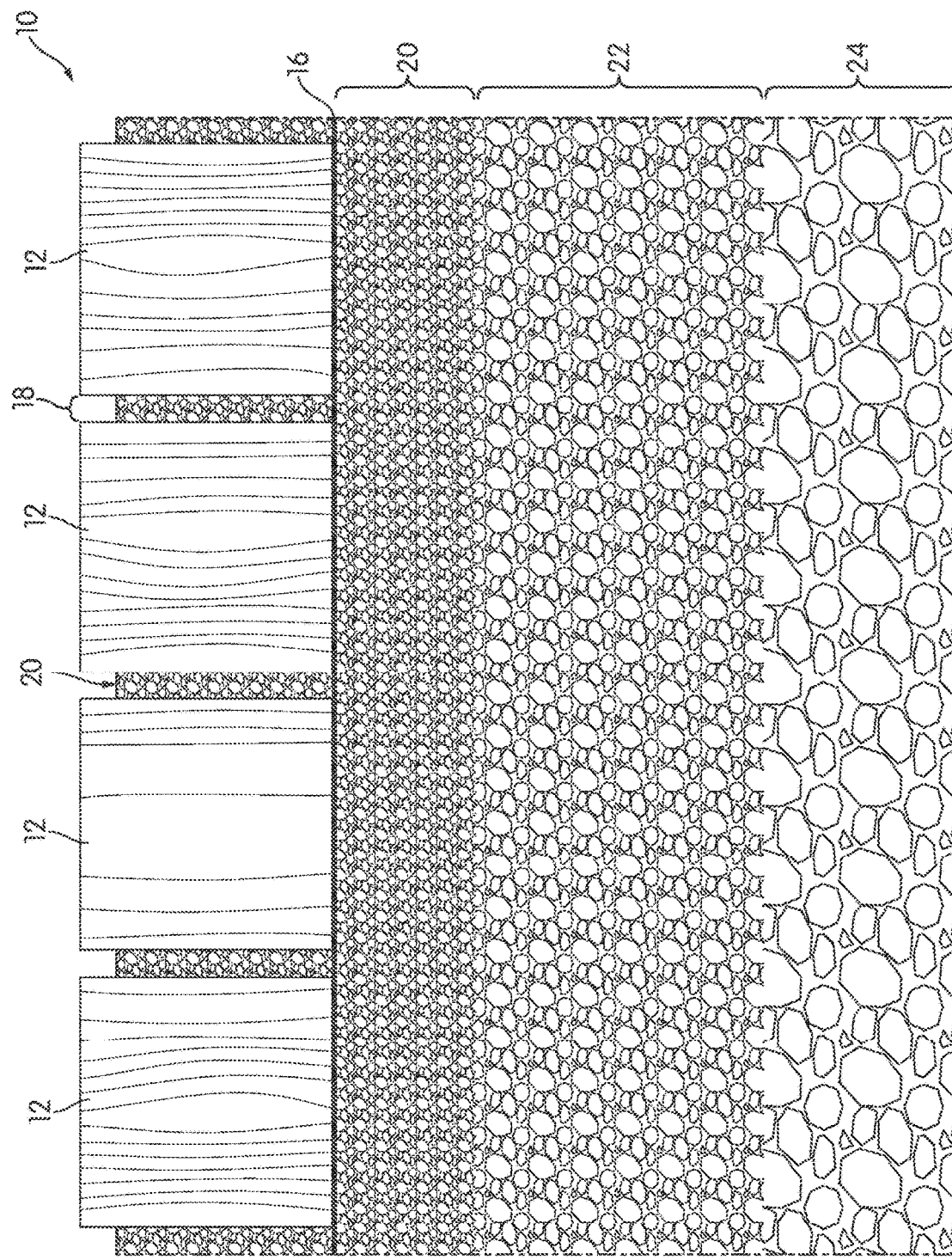
FIG. 3 is a sectional elevational view of the wooden paving tiles of FIG. 1 after installation in a landscape.

FIG. 3 is a sectional elevational view of the installed patio 10 from FIG. 1 showing paving tiles 12 placed above the wire mesh 16. The void space 18 of this embodiment is filled with a permeable material, such as crushed stone 20 (e.g. ASTM #8), so as to help maintain an appropriate void space 18 and allow water to pass between paving tiles 12.

As shown in FIG. 3, there may be any number of underlayers beneath the wire mesh 16, or, if no wire mesh 16 is used, beneath the tiles 12 themselves. A number of methods for underlying paving tiles 12 are known to those with skill in the art, and any such methods may be used. In particular, additional layers of material with equal or greater permeability compared to the crushed stone 20 would be appropriate. In FIG. 3, there are three layers 20, 22, 24, each with material of a defined and graduated size. As one example, the layers 22, 24 may be crushed rock 22 (e.g. ASTM #57) and gravel 24 (e.g. ASTM #2) so as to promote water passage underground.

Figure 4:
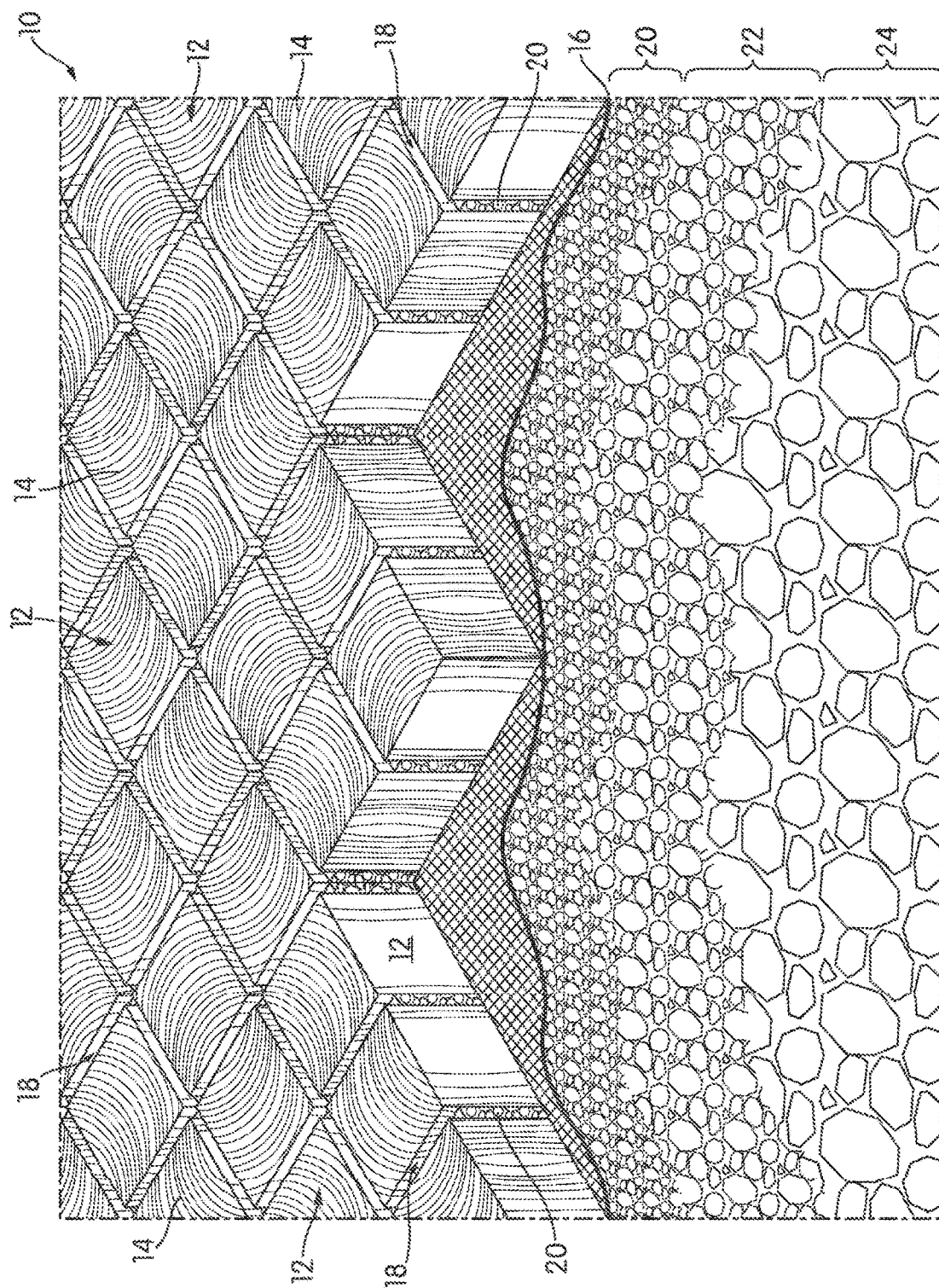
FIG. 4 is an isometric sectional view of the plurality of wooden paving tiles of FIG. 1 installed in the landscape

FIG. 4 is a partially sectional perspective view of one embodiment of the installed patio 10 from FIG. 1, showing the tiles 12 relative to the wire mesh 16 and the underlying layers 20, 22, 24. Each paving tile 12 is uniformly separated from the next by void space 18 that is maintained by filling with crushed stone 20 (e.g. ASTM #8). In FIGS. 3 and 4, the wire mesh 16 is shown as being a flat sheet below the tiles 12. However, in some embodiments, the wire mesh 16 could be shaped with raised portions that extend between tiles 12.

As shown in FIGS. 3 and 4, the tiles 12 are dimensioned and arranged such that the patio 10 itself presents a level top surface. As with the spacing between tiles 12, local and regional laws or regulations may specify a maximum unevenness, or deviation in height, from one tile 12 to the next. For example, at the time of writing, the Americans With Disabilities Act (ADA), which is the basic controlling law in the United States, requires a vertical change in level of no more than 1/4 inch (6.4 mm). While it may not be necessary to comply with such laws and regulations in all embodiments or installations, it is often preferable if the tiles 12 are sized, dimensioned, and positioned to comply with local laws and regulations. Of course, one advantage of the tiles 12 is that if any particular tiles 12 cause a height or evenness problem, individual tiles 12 can be sanded or planed to bring the surface as a whole into compliance.

The plurality of wooden tiles 12 is not expected to absorb short-wave radiation during the day and thus, should not release long-wave radiation during the night, which could help to reduce the aforementioned effects of an urban heat island. Additionally, the aesthetic qualities are considerably more unique and potentially pleasing than methods of paving that involve concrete.

Figure 8:
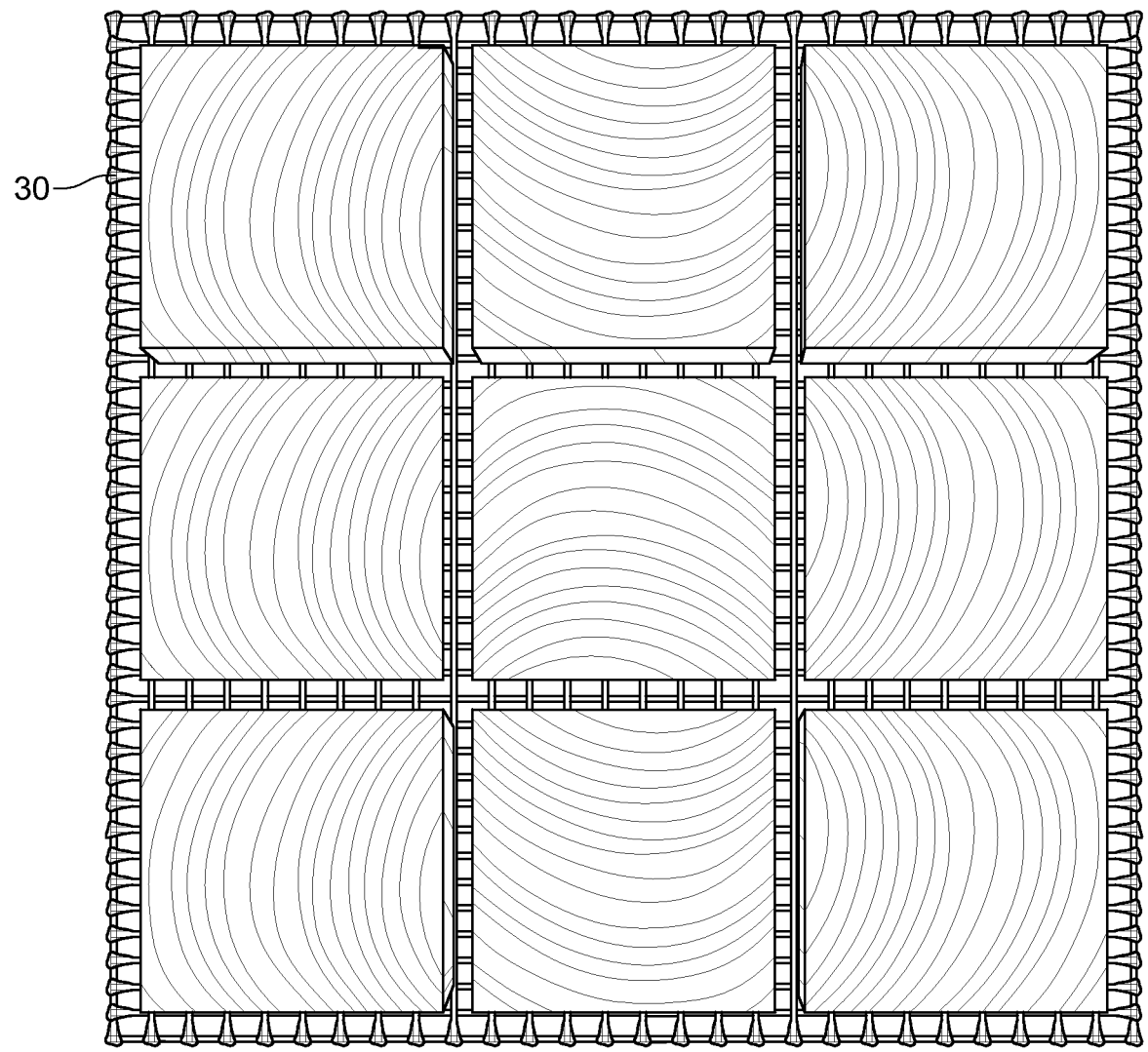
FIG. 8 illustrates a perspective view of the tiles (wood pavers) incorporating safety edges on the wire mesh, according to one or more embodiments of the presently disclosed subject matter.
Figure 9:
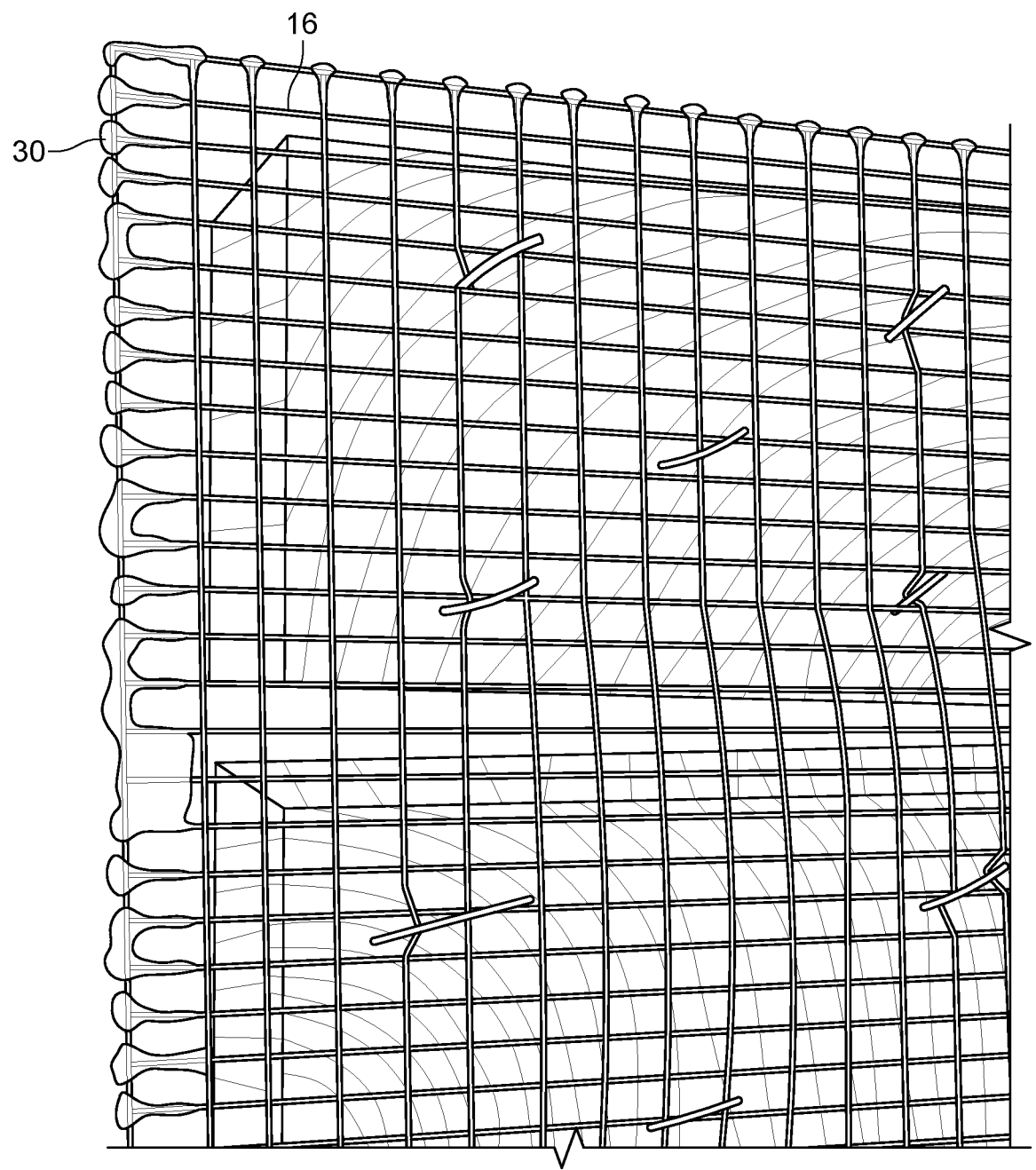
FIG. 9 illustrates a perspective view of the tiles (wood pavers) incorporating safety edges on the wire mesh, according to one or more embodiments of the presently disclosed subject matter.
Figure 10:
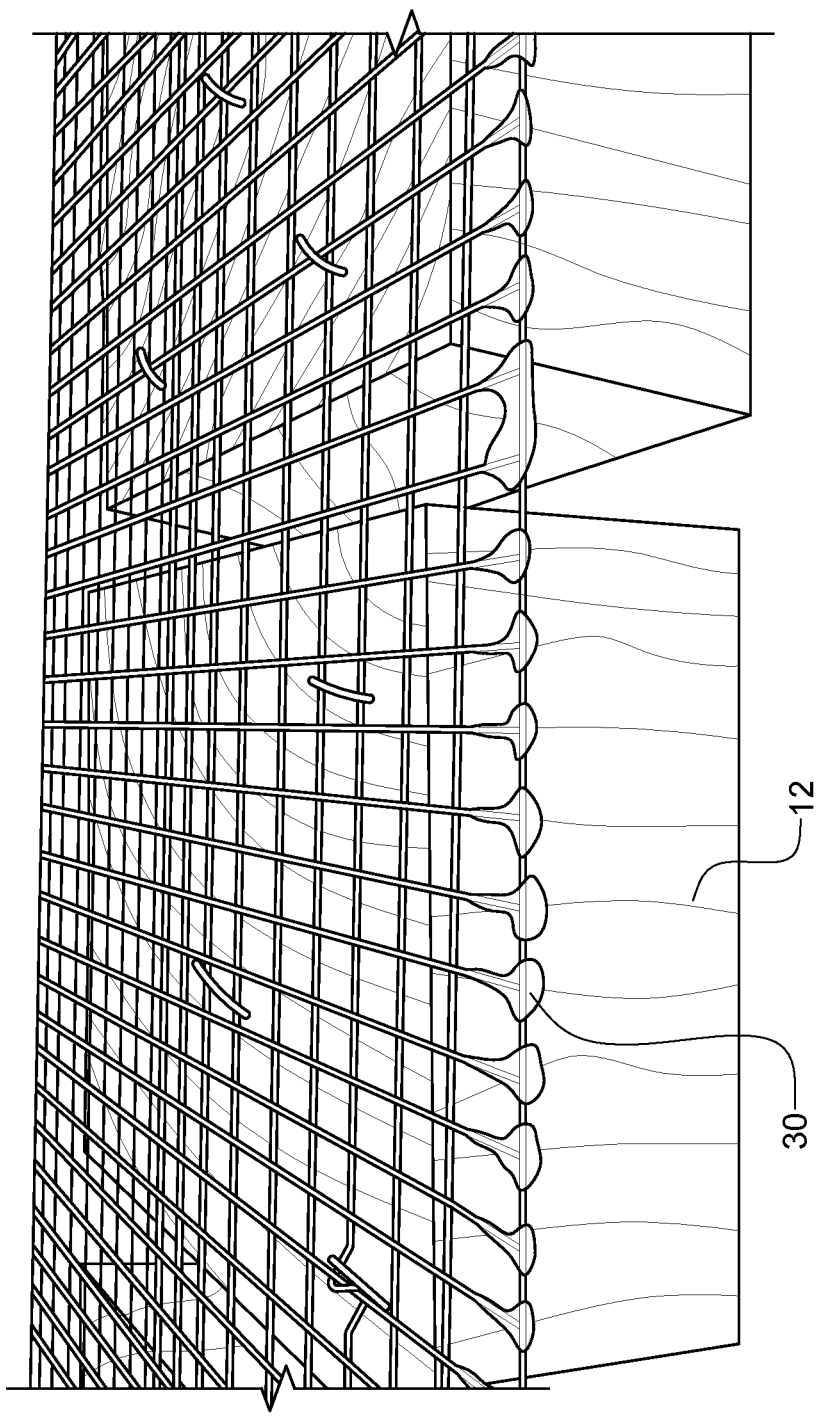
FIG. 10 illustrates a perspective view of the tiles (wood pavers) incorporating safety edges on the wire mesh, according to one or more embodiments of the presently disclosed subject matter.
Figure 11:
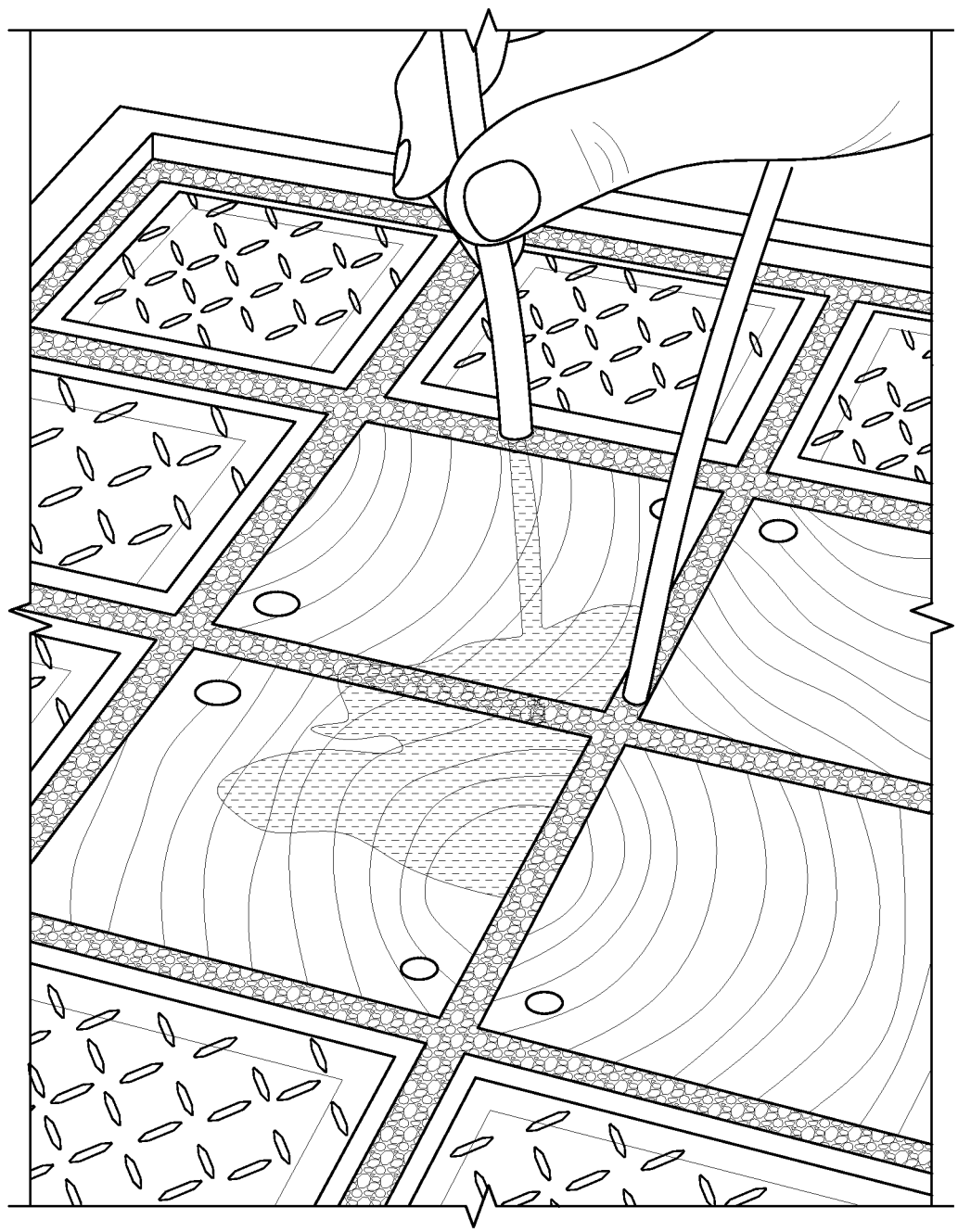
FIG. 11 illustrates a solar pavers operating display with a desktop display, water pump and LED lights, and show a working, operational solar collector.

According to one or more embodiments, a safety edge 30 may be added to the wire mesh 16. In one embodiment, the safety edge 30 is a beeswax coating which is 100% natural and prevents a user from cutting their hands when handling the wire mesh 16 backed permeable black locust pavers. A wire mesh 16 backed pavers with a beeswax safety edge 30 is illustrated in FIGS. 8-10.

According to one or more embodiments, the safety edge 30 may be made from soy wax, rubber, or any other flexible coatings.

Figure 5:
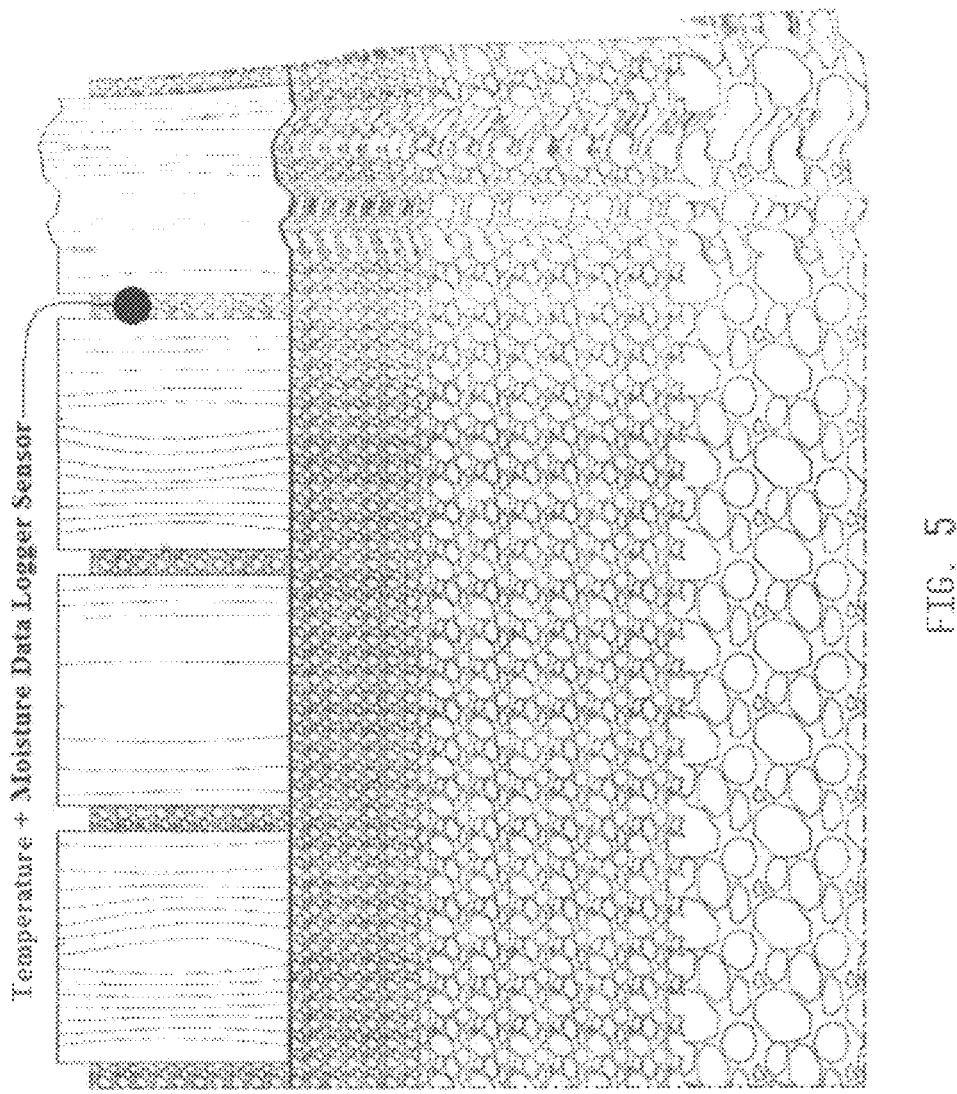
FIG. 5 is a sectional elevational view of the wooden paving tiles of FIG. 1, showing the embedded wireless temperature and moisture data logger sensor.

A Wireless Temperature and Moisture Data Logger may be embedded into the gaps in pavers as illustrated in FIG. 5. This will allow both temperature and moisture readings to be collected by the data logger. This information can be used to prevent injury caused by surface activity and conditions (e.g. slipping due to snow and/or ice). The wireless data logger will transmit data to the cloud for information revival, in order to facilitate proper snow removal or deicing. This information will greatly contribute to reducing possible slip and fall accidents.

Figure 6:
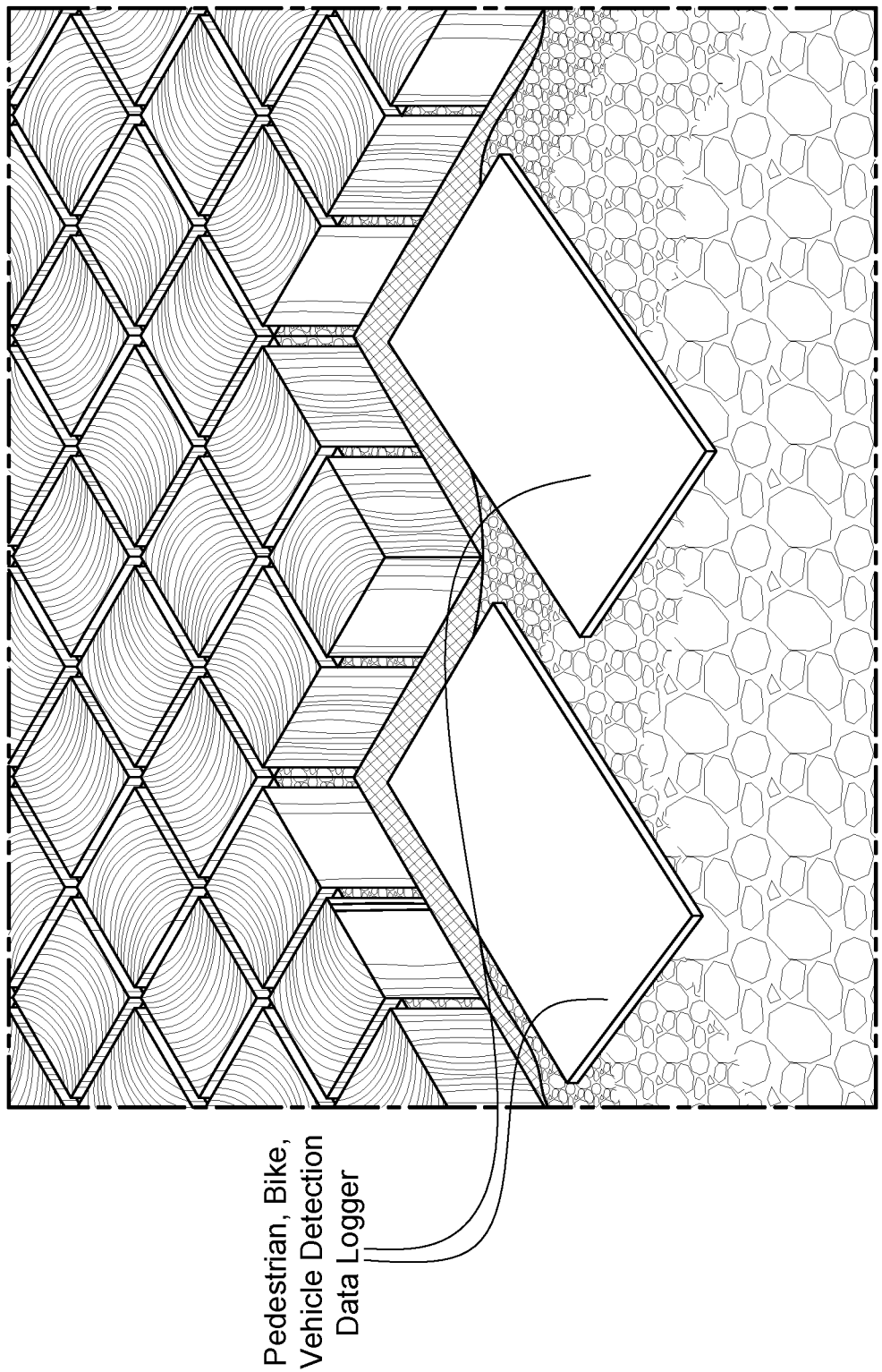
FIG. 6 is an isometric sectional view of the tiles of FIG. 1 with the wireless data logger sensor embedded for pedestrian, bike, vehicle detection.

Wireless Pad-Type Data Logger may be installed under pavers in areas where activity counting is desired as illustrated in FIG. 6. The logger has the ability to count people, bikes, and vehicles in a non-visible, protected environment. Information provided by the wireless data logger is useful for city planning, design, and maintenance of public spaces. Furthermore, traffic flows and volumes, city services requirement data can be determined, as well. The flow and volume of traffic can be recorded to help cities prioritize maintenance and repairs.

Figure 7:
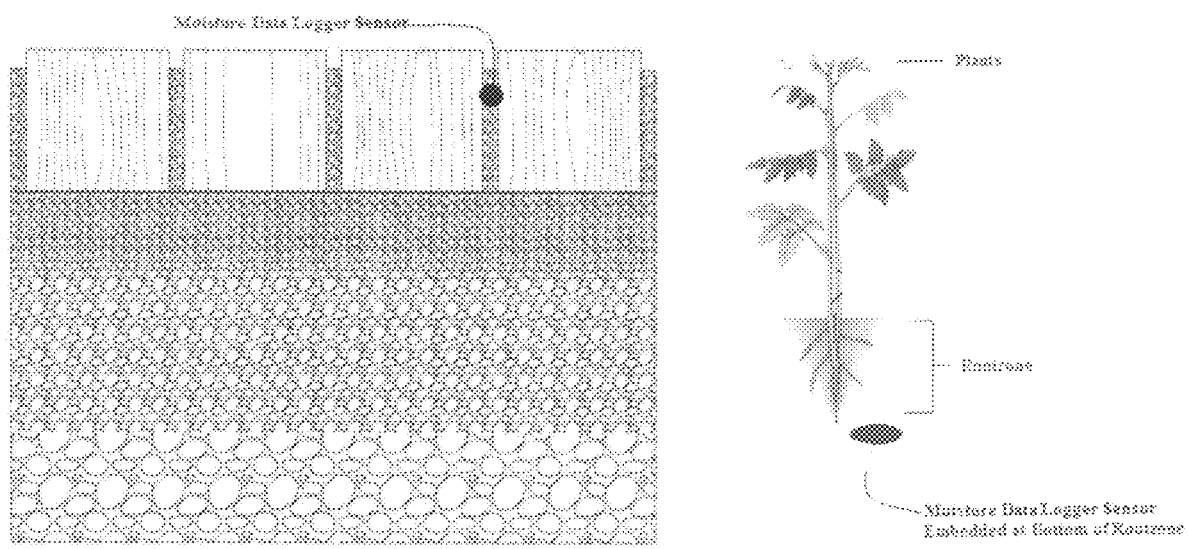
FIG. 7 is a sectional elevational view of the tiles of FIG. 1, showing the wireless moisture data logger sensor embedded into the soil and the tiles.

A Wireless Moisture and Ground-water Level Data Logger may be embedded in the pavers as well as located at the bottom of the root zone of plants as illustrated in FIG. 5 and FIG. 7. This data allows automatic control of onsite irrigation systems. Water may be saved by using the natural rainwater that has permeated into the soil and by reducing over-watering of plants. Water levels beyond plants' root zone are unusable to the vegetation and therefore, wasted. By applying the wireless data logger, water usage can be reduced; moreover, it promotes healthy plant propagation.

One advantage of using black locust lumber over pine or cedar is its durability. Pine and cedar are soft and will disintegrate in a short time, whereas black locust lumber can last 50-60 years. Because black locust outlasts concrete and other types of wood, the purchase of black locust lumber pavers can be incentivized by the awarding of carbon credits. Solar reflectance rating, or albedo, is also higher for black locust wood because the natural grain of the locust ages to a silver grey color, which reflects light. This means that black locust lumber stays cooler than asphalt or other darker alternatives.

Figure 14:
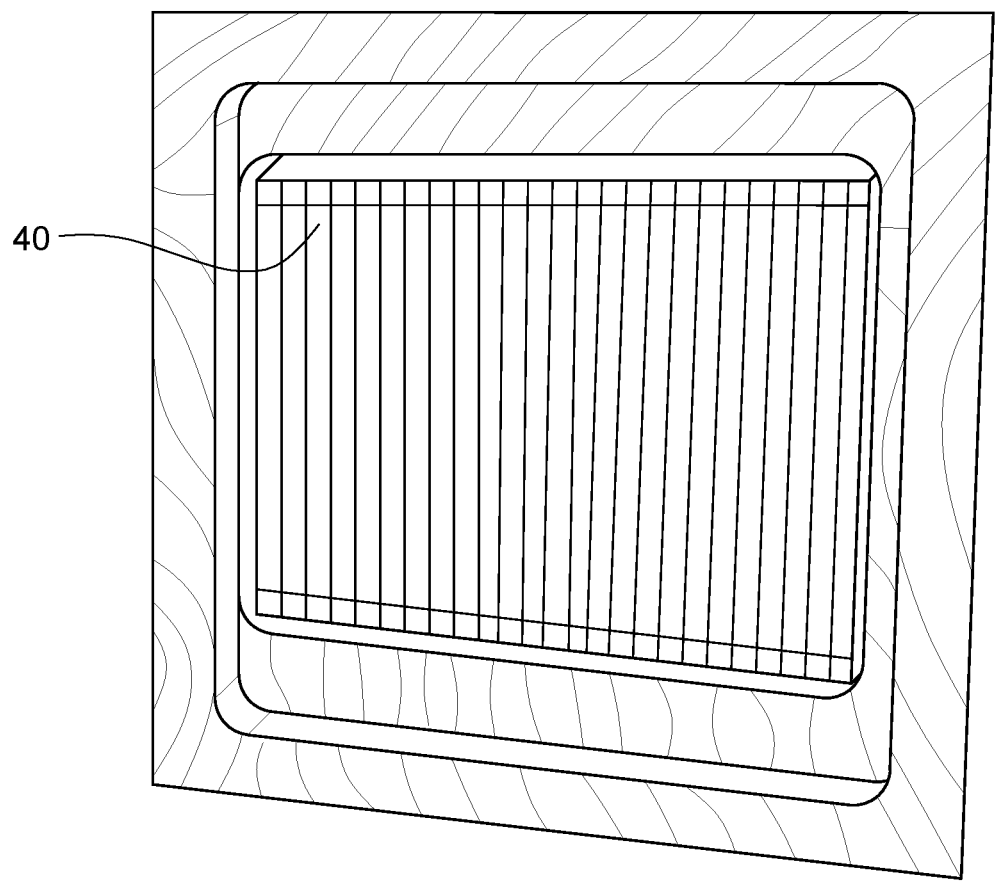
FIG. 14 illustrates a view of the tiles (wood pavers) incorporating solar cells, according to one or more embodiments of the presently disclosed subject matter.
Figure 16:
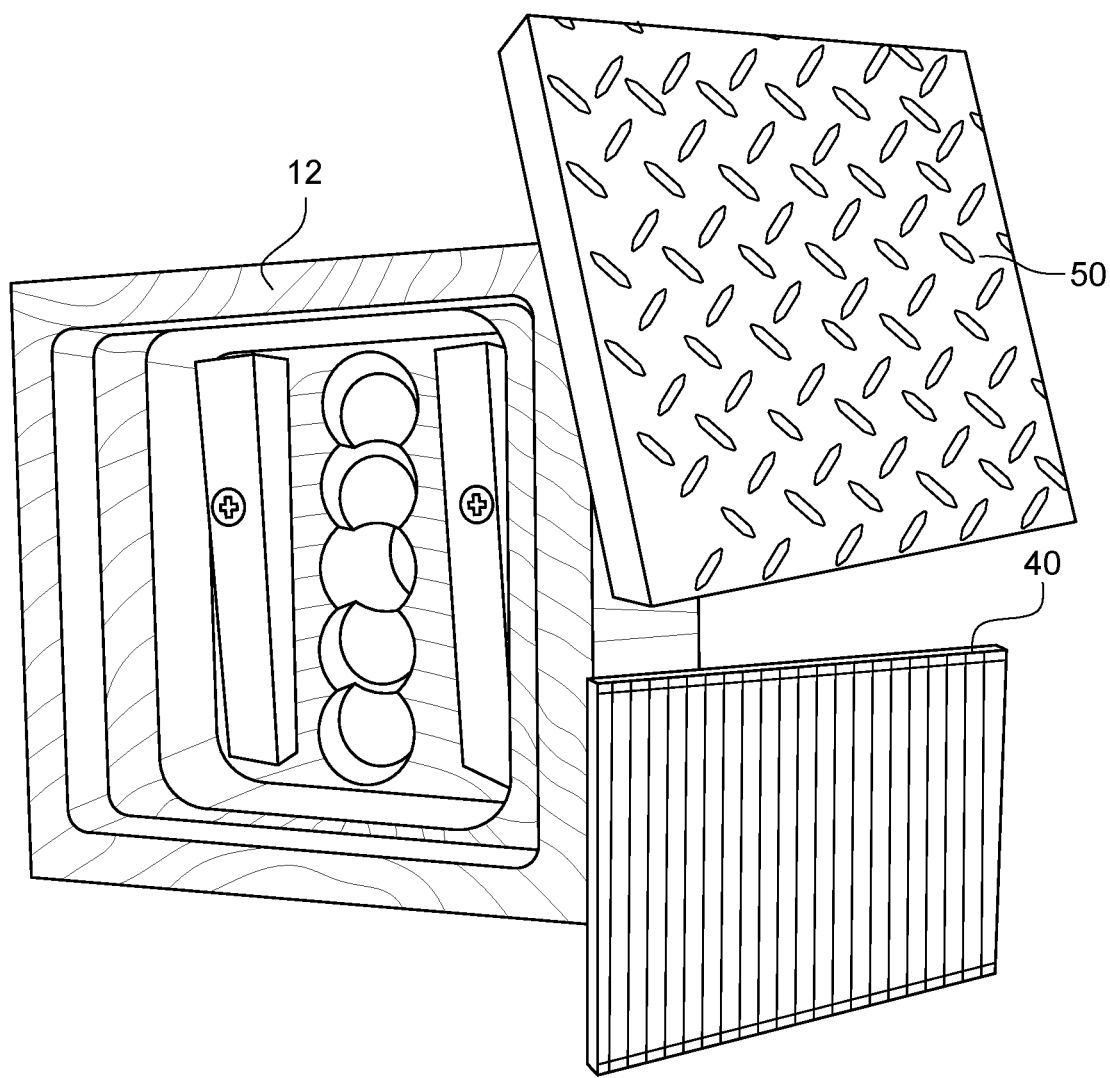
FIG. 16 illustrates a view of the tiles (wood pavers) incorporating solar cells, according to one or more embodiments of the presently disclosed subject matter.

According to one or more embodiments, the wood pavers incorporate a solar cell 40 in each block or tile 12 as shown in FIGS. 14 and 16. The terms "block" and "tile" can be used interchangeably. All solar cell blocks/tiles are mounted on the mesh backing and are modular in design. They are linked together with waterproof electric connections. The number of solar cells per permeable panel can be changed in the overall paver panel design. This can allow maximum solar generation (e.g. each block per panel) or random solar cells per panel for extra slip resistance or decorative design.

Figure 15:
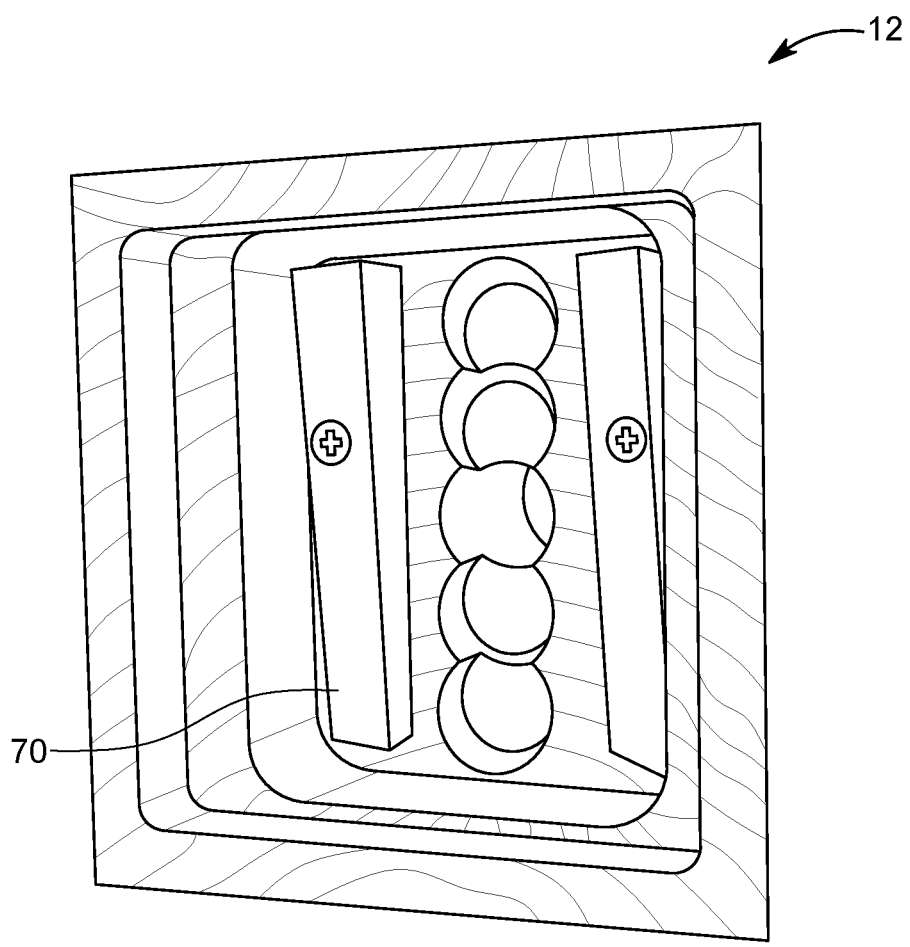
FIG. 15 illustrates a view of the tiles (wood pavers) incorporating solar cells, according to one or more embodiments of the presently disclosed subject matter.

Each block is cut out in a step design as shown in FIGS. 15 and 16 to allow the placement of the glass 50 and the solar cell 40. This step design allows the block 12 to be load bearing capable of supporting pedestrians and light vehicle traffic. The top glass 50 comprises an anti-slip manufacture to make the surface as slip resistance as possible and within relevant building codes.

Figure 17:
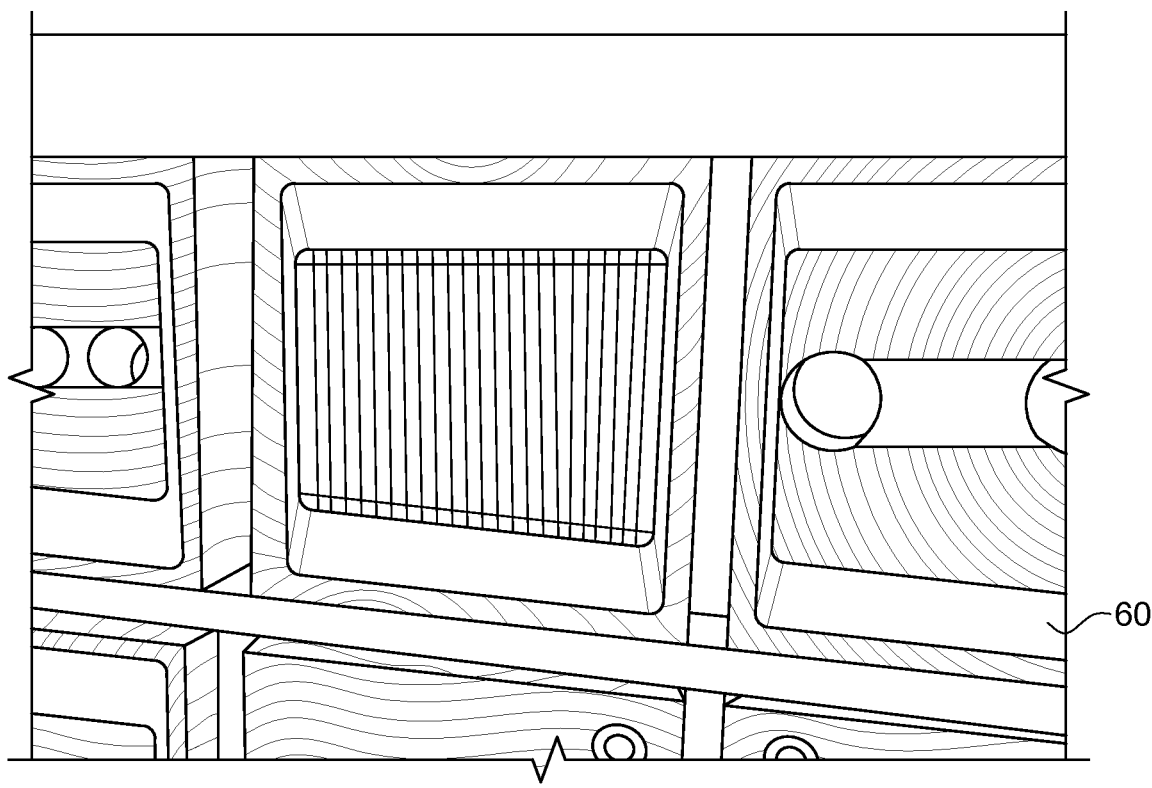
FIG. 17 illustrates a view of the tiles (wood pavers) incorporating solar cells, according to one or more embodiments of the presently disclosed subject matter.

The interior of the step cut out is lined with a reflective material 60 (e.g. aluminum foil) as shown in FIG. 17, to focus the light rays on to the surface of the solar cell to increase solar efficiency. There are two wooden wedges inside the cut out interior steps the can be used to adjust the solar cells to an optimal angle based on the latitude of the installation site. By tilting the angle of the solar cell, you increase the solar gain and efficiency. It also gives the ability to use a flat walkable surface, the pavers, while still being able to angle the solar cells.

The individual blocks are drilled and grooved in four directions to allow for wire placement. This allows for commonality in block placement on the mesh backer. The same installation process is involved as described earlier, however in this embodiment there is a waterproof connector linking the pavers together.

Figure 12:
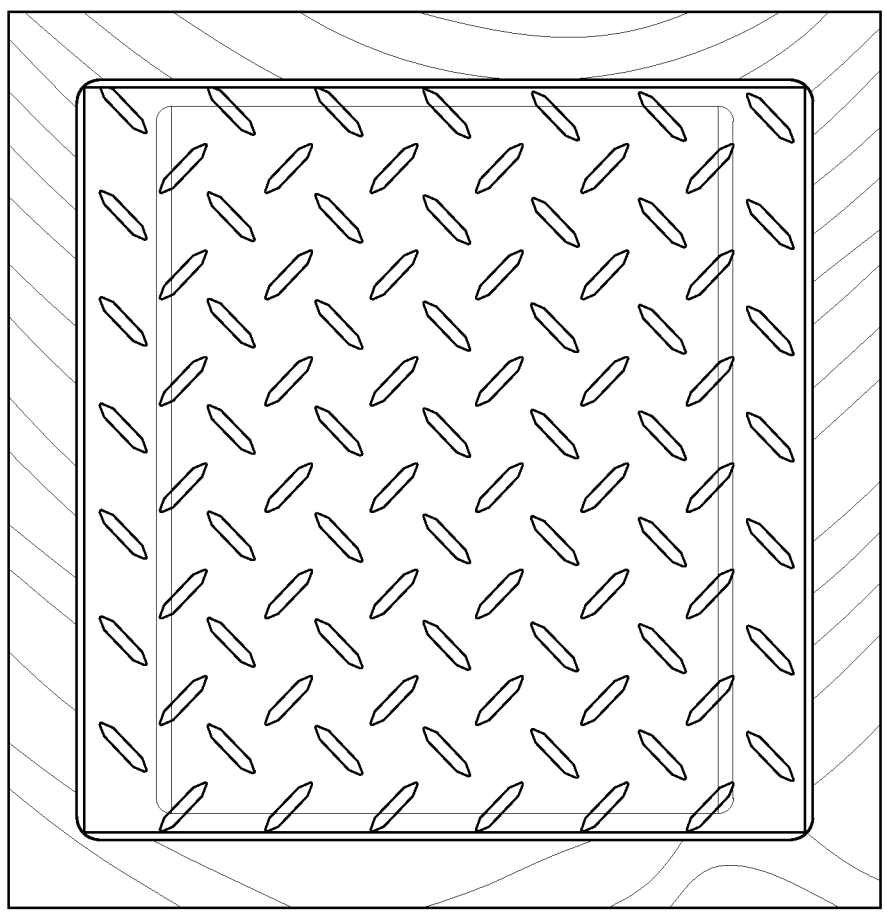
FIG. 12 illustrates a view of the tiles (wood pavers) incorporating solar cells, according to one or more embodiments of the presently disclosed subject matter.

FIG. 12 illustrates a completed solar cell block including a Black Locust frame, anti-skid walkable glass, and solar cell. The reflective foil is not shown.

Figure 13:
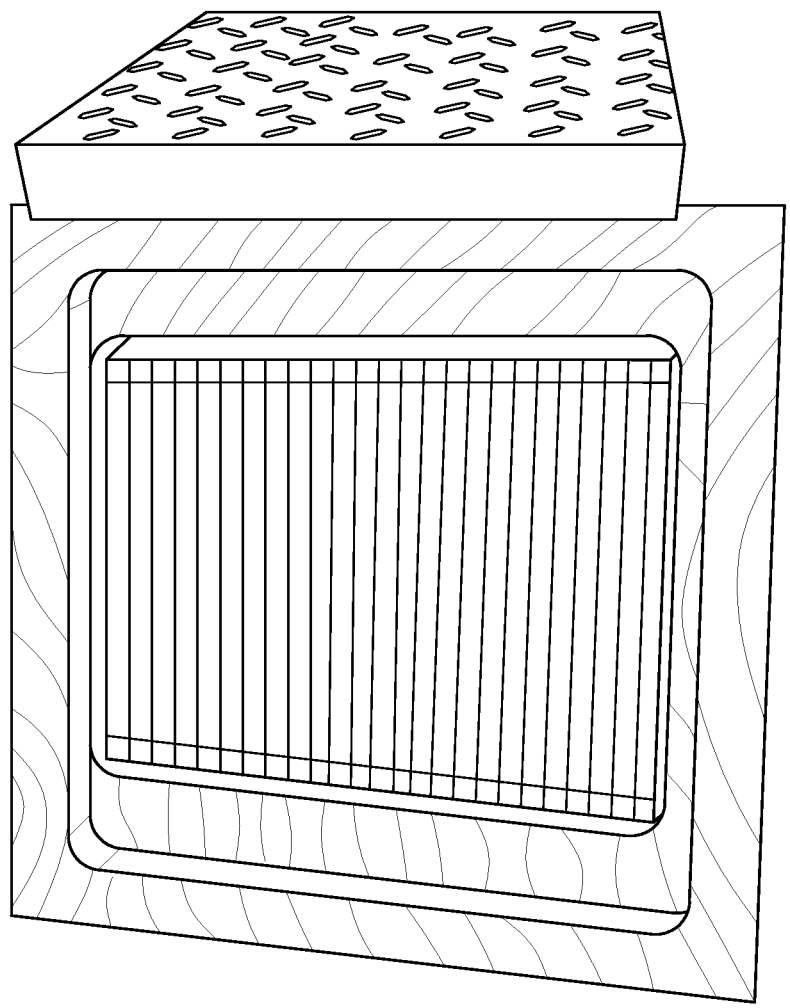
FIG. 13 illustrates a view of the tiles (wood pavers) incorporating solar cells, according to one or more embodiments of the presently disclosed subject matter.

FIG. 13 illustrates unit pieces including weight bearing walkable glass, a solar cell, and cut out Black Locust wood block showing the details of the drilled out support step.

FIG. 14 illustrates the interior step, weight-bearing design detail, note the glass is supported on four sides. Included is a solar cell, the reflective foil is not shown.

FIG. 15 illustrates wedges 70 used to adjust the angle of the solar cell. Wooden or plastic wedges 70 may be used.

FIG. 16 illustrates a separated view of the components including glass, Black Locust wood block, step supporting levels, solar adjustable angle wedges, and solar cell. The reflective foil is not shown.

FIG. 16 also illustrates the separated components and their relative size.

FIG. 17 illustrates reflective foil applied on step surfaces. This allows increased solar cell efficiency.

Figure 18:
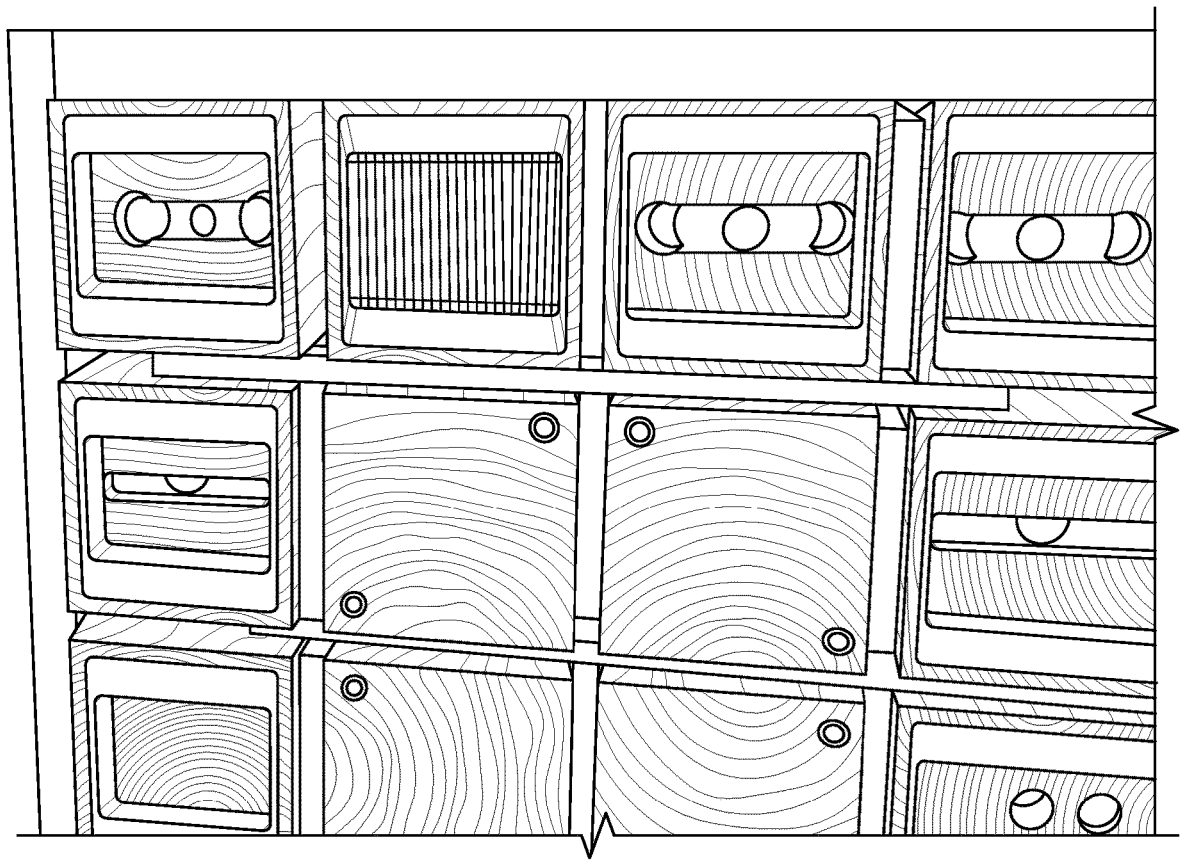
FIG. 18 illustrates a view of the tiles (wood pavers) incorporating solar cells, according to one or more embodiments of the presently disclosed subject matter.

FIG. 18 illustrates more details of the reflective surfaces.

Figure 19:
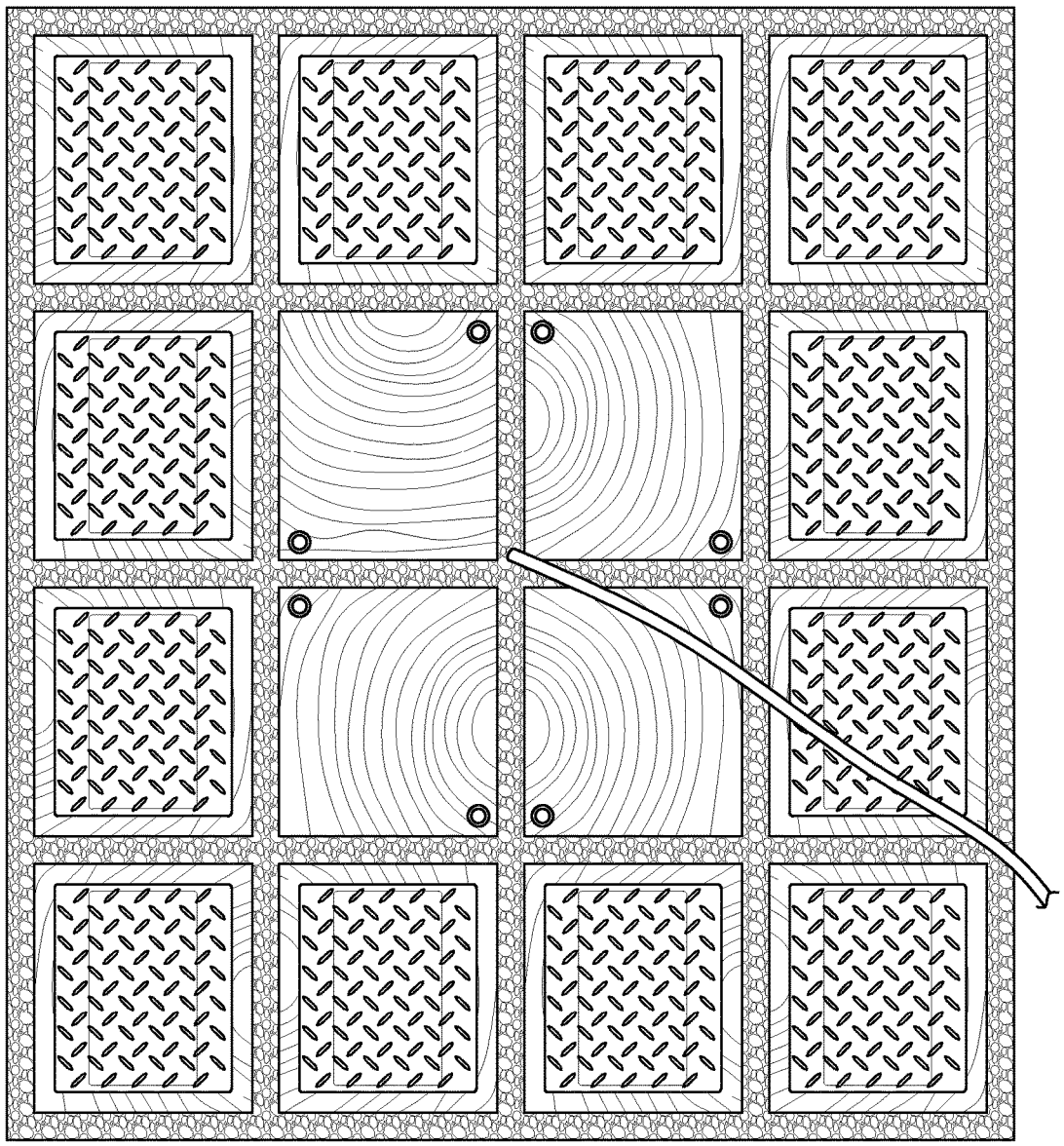
FIG. 19 illustrates a view of the tiles (wood pavers) incorporating solar cells, according to one or more embodiments of the presently disclosed subject matter.

FIG. 19 illustrates a sample used for display. It shows completed solar blocks with gravel permeable infill.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While the invention has been described with respect to certain exemplary embodiments, the embodiments are intended to be illuminating rather than limiting. Modifications and changes may be made within the scope of the invention, which is defined by the appended claims.

What is claimed:

1. A paving system, comprising:
 a backing matrix;
 a plurality of wood pavers arranged in a defined pattern relative to one another on the backing matrix, the defined pattern creating regular void spaces therebetween;
 a permeable medium disposed between the wood pavers and the void spaces;

respective solar cells embedded within a recess in a top surface of each of the plurality of wood pavers;

a transparent covering that is received within the recess in the top surface of each of the plurality of wood pavers;

one or more layers of underlayment beneath the matrix, the one or more layers of underlayment having graduated sizes or porosities; and a beeswax safety coating displaced around a perimeter of the backing matrix;

a wired connection extending between two of the solar cells to combine power output from two of the solar cells.

2. The paving system of claim 1, wherein the matrix comprises a wire mesh.

3. The paving system of claim 1, wherein the wood pavers are fastened to the backing matrix.

4. The paving system of claim 1, wherein the wood pavers are substantially cubic tiles.

5. The paving system of claim 1, wherein the permeable medium comprises gravel.

6. The paving system of claim 1, wherein the one or more layers of underlayment comprise gravel or crushed rock.

7. A paving system, comprising:
a. a backing matrix;
b. a plurality of black locust wood pavers arranged in a defined pattern relative to one another on the backing matrix, the defined pattern creating regular void spaces therebetween;
c. a permeable medium disposed between the wood pavers and filling the void spaces;
d. at least two solar cells embedded within a recess machined into a top surface of at least two wood pavers;
e. a transparent covering that is received within the recess machined into each of the pavers having solar cells embedded therein, the transparent covering having a top surface that is generally flush with the top surface of the respective wood paver;
f. one or more layers of underlayment beneath the matrix, the one or more layers of underlayment having graduated sizes or porosities;
g. a flexible coating displaced around the perimeter of the backing matrix, wherein the flexible coating is a natural ingredient; and
h. a wired connection extending between the two solar cells to combine power output from the two solar cells.

8. The paving system of claim 7, wherein the flexible coating is beeswax.

9. The paving system of claim 7, wherein the wood paver comprises wedges positioned below a respective solar cell in the paver that are configured for positioning the solar cell at a fixed angle.

10. The paving system of claim 7, wherein the wood paver comprises a reflective surface configured for maximizing efficacy of the solar cell.

* * * * *